US006198568B1

(12) United States Patent
Galvanauskas et al.

(10) Patent No.: US 6,198,568 B1
(45) Date of Patent: *Mar. 6, 2001

(54) USE OF CHIRPED QUASI-PHASE-MATCHED MATERIALS IN CHIRPED PULSE AMPLIFICATION SYSTEMS

(75) Inventors: Almantas Galvanauskas; Donald J. Harter, both of Ann Arbor, MI (US)

(73) Assignee: Imra America, Inc., Ann Arbor, MI (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/845,409

(22) Filed: Apr. 25, 1997

(51) Int. Cl.⁷ .................. G02F 1/35; H04B 10/14

(52) U.S. Cl. .................. 359/332; 359/341; 359/569

(58) Field of Search .................. 359/332, 341, 359/569

(56) References Cited

U.S. PATENT DOCUMENTS

| 3,729,690 | 4/1973 | Snitzer et al. . | |
|---|---|---|---|
| 4,546,476 | 10/1985 | Shaw et al. . | |
| 4,815,079 | 3/1989 | Snitzer et al. . | |
| 5,499,134 | 3/1996 | Galvanauskas et al. | 359/337 |
| 5,541,947 | * 7/1996 | Mourou et al. | 372/55 |
| 5,696,782 | * 12/1997 | Harter et al. | 372/25 |
| 5,745,629 | * 4/1998 | Sasaki | 385/122 |
| 5,815,307 | * 9/1998 | Arbore et al. | 359/328 |
| 5,862,287 | * 1/1999 | Stock et al. | 385/123 |

OTHER PUBLICATIONS

D. Strickland and G. Mourou, Opt. Commun. 56, 219 (Dec. 1985).

P. Maine, D. Strickland, P. Bado, M. Pessot and G. Mourou, IEEE J. of Quantum Electron., vol. 24 No. 2, 398 (Feb., 1988).

A. Galvanauskas, M.E. Fermann and D. Harter, "All–fiber femtosecond pulse amplification circuit using chirped Bragg gratings", Appl. Phys. Lett. 66 (9), Feb. 1995).

U.S. application No. 08/824,032, M.A. Arbore, and M.M. Fejer, filed Apr. 25, 1997, "Aperiodic Quasi–Phase–Matching Gratings for Chirp Adjustment and Frequency Conversion of Ultrashort Pulses".

(List continued on next page.)

*Primary Examiner*—Nelson Moskowitz
(74) *Attorney, Agent, or Firm*—Sughrue, Mion, Zinn, Macpeak & Seas, PLLC

(57) ABSTRACT

The limitations on maximum pulse energies from a fiber-grating pulse compressor are circumvented by placing a chirped-period quasi-phase-matched (QPM) crystal after the fiber-grating pulse compressor. The crystal accomplishes second-harmonic generation and stretched-pulse compression at the second-harmonic in a single device. This hybrid compressor configuration enables a substantial increase in ultrashort pulse energies obtainable with a compact all-fiber chirped pulse amplification system. Furthermore, with such a QPM crystal the adjustable compensation of both linear and nonlinear frequency chirp in second-harmonic pulses is possible. This property makes a variety of compact, robust and simple ultrashort-pulse fiber amplifier designs possible. It also allows for certain tolerances in the design and manufacturing of a pulse amplification system. Capability to compensate an arbitrary frequency chirp allows nonlinear spectral-broadening techniques for achieving shorter second-harmonic pulse durations. Also, by employing chirped QPM crystals maximum energy throughput and good second-harmonic pulse quality can be achieved.

55 Claims, 12 Drawing Sheets

OTHER PUBLICATIONS

U.S. application No. 08/845,410, Almantas Galvanauskas, Mark A. Arbore, Martin M. Fejer and Donald J. Harter, filed Apr. 25, 1997, "Use of Aperiodic Quasi–Phase–Matched Gratings in Ultrashort Pulse Sources".

A. Galvanauskas et al., Generation of femtosecond optical pulses with nanojoule energy from a diode laser and fiber based system, Appl. Phys. Lett. vol. 63, No. 13, Sep. 27, 1993, pp. 1742–1744.

N. Stelmakh et al, "Ultrashort pulse generation from a Q–switched AlGaAs Laser with cw injection," Appl. Phys. Lett. vol. 59, No. 6, Aug. 5, 1991, pp. 624–626.

P. Delfyett et al, "200–fs optical pulse generation and intracavity pulse evolution in a hybrid–mode–locked semiconductor diode–laser/amplifier system," Optics Letters, vol. 17, No. 9, May 1, 1992.

M.E. Fermann, "Ultrashort–Pulse Sources Based on Single–Mode Rare–Earth–Doped Fibers" Appl. Phys. 58, 197–209 (1994).

M Nakazawa et al, Femtosecond Optical Pulse Generation Using a Distributed–Feedback Laser Diode, Electronics Letters, Nov. 22, 1990, vol. 26, No. 24, pp. 2038–2040.

A. Galvanauskas et al, "High–power amplification of femtosecond optical pulses in a diode–pumped fiber system," Optics Letters, Aug. 15, 1994, vol. 14, No. 16, pp. 1201–1203.

D. Strickland, et al, "Compression of Amplified Chirped Optical Pulses" Optics Communications, Dec. 1, 1985, vol. 56, No. 3, pp. 219–221.

A. Galvanauskas et al, "Hybrid diode–laser fiber–amplifier–amplifier source of high–energy ultrashort pulses" Optics Letters, Jul. 15, 1994, vol. 19 No. 14, pp. 1043–1045.

A Galvanauskas, "Compact Ultrahigh–Power Laser Systems," IMRA America, Inc.

A. Galvanauskas et al., "All–fiber femtosecond pulse amplification circuit using chirped bragg gratings", Appl. Phys. Lett., Feb. 27, 1995, vol. 66, No. 9, pp. 1053–1055.

H. Po et al, "High Power Neodymium–doped single transverse mode fibre laser", Electronics Letters, Aug. 19, 1993, vol. 29, No. 17, pp. 1500–1501.

W.A. Clarkson et al., "Novel beam shaping technique for high–power diode bars," CLEO '94.

Y. Miyajima et al., "Rare–Earth–Doped Fluoride Fiber Amplifiers and Fiber Lasers", Optical Fiber Technology 1, 1994, pp. 34–47.

Galvanauskas et al, OFC '95, vol. 8, pp 133–4, Washington, D.C.; Abstract Only Herewith, Mar. 3, 1995.*

Galvanauskas et al, Appl. Phys. Lett. vol. 63, #13, pp 1742–4; Abst. Only Herewith, Sep. 27, 1993.*

Galvanauskas, A.; Proc. SPIE,–vol. 2377, pp 117–126; Abstract Only Herewith, 1995.*

Agouz et al, Appl. Phys. Lett., vol. 67, #161 Abst. Only Herewith, Oct. 14, 1995.*

* cited by examiner

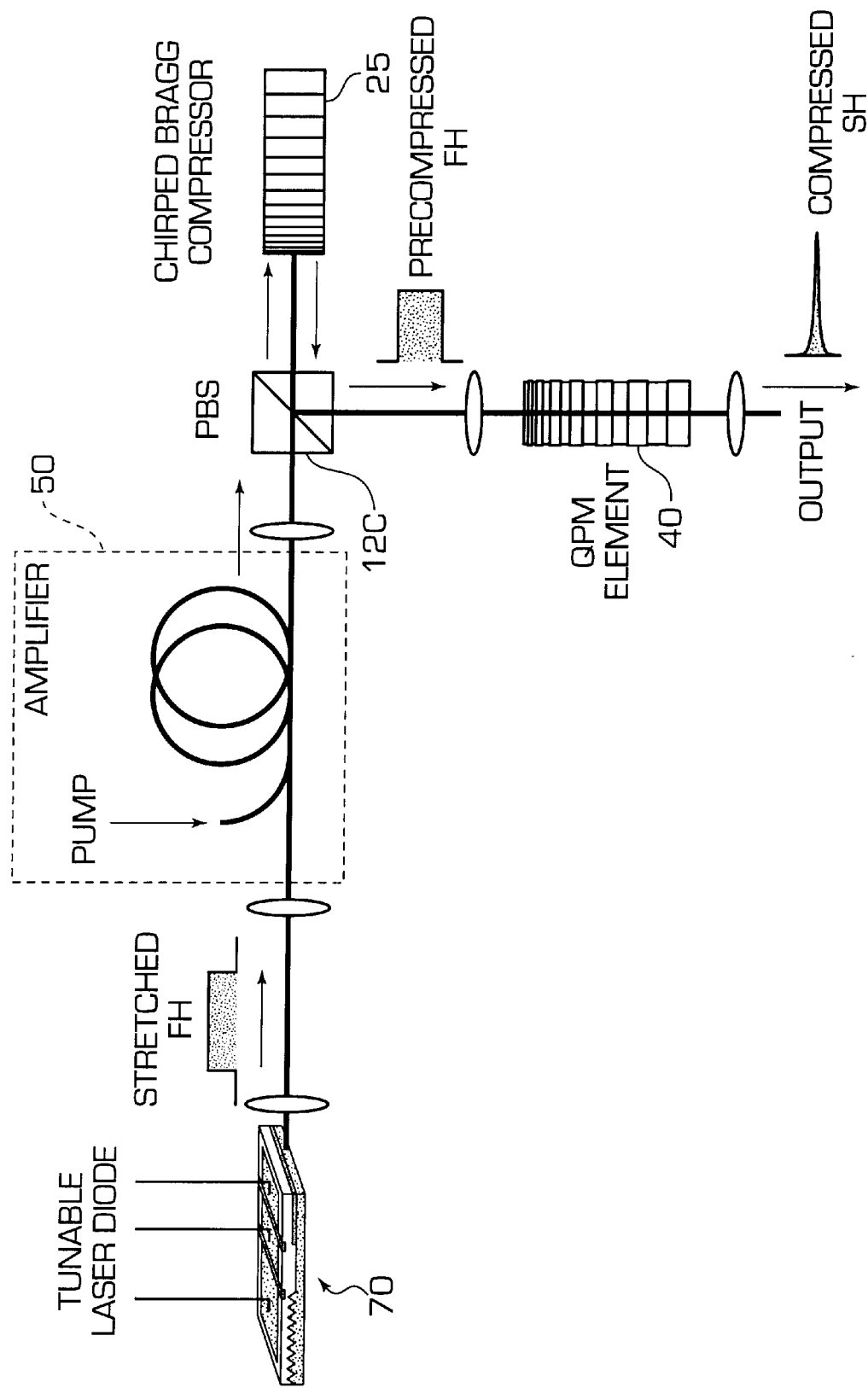

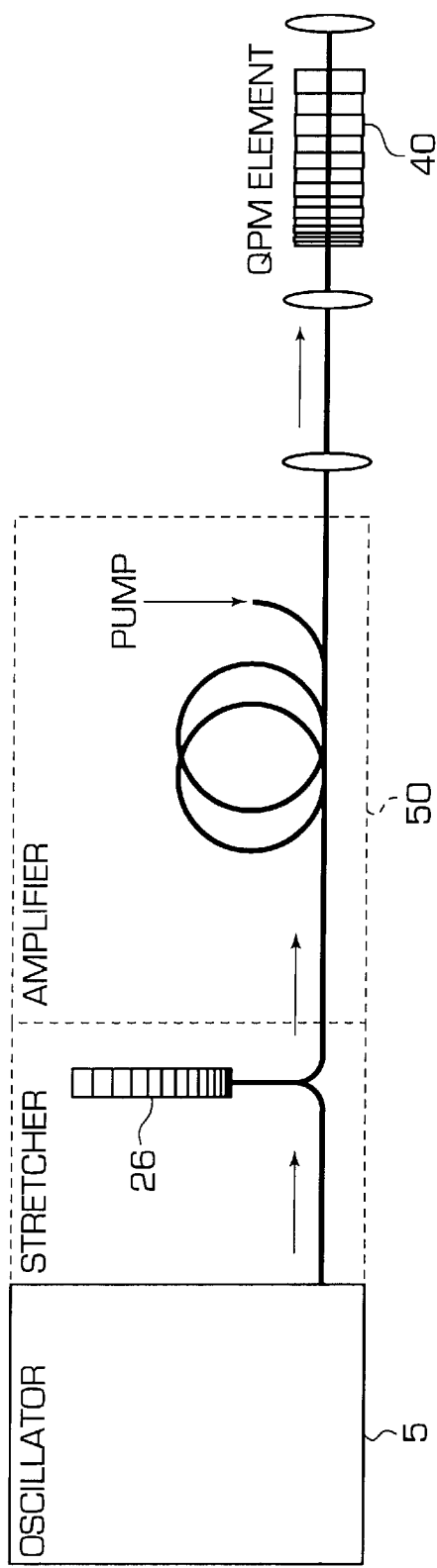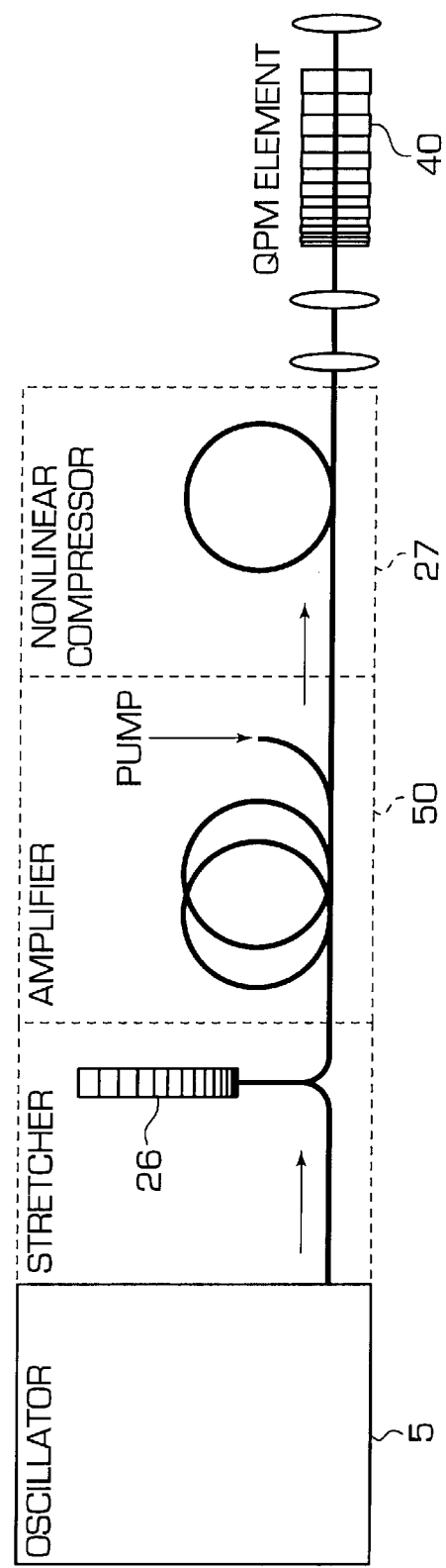

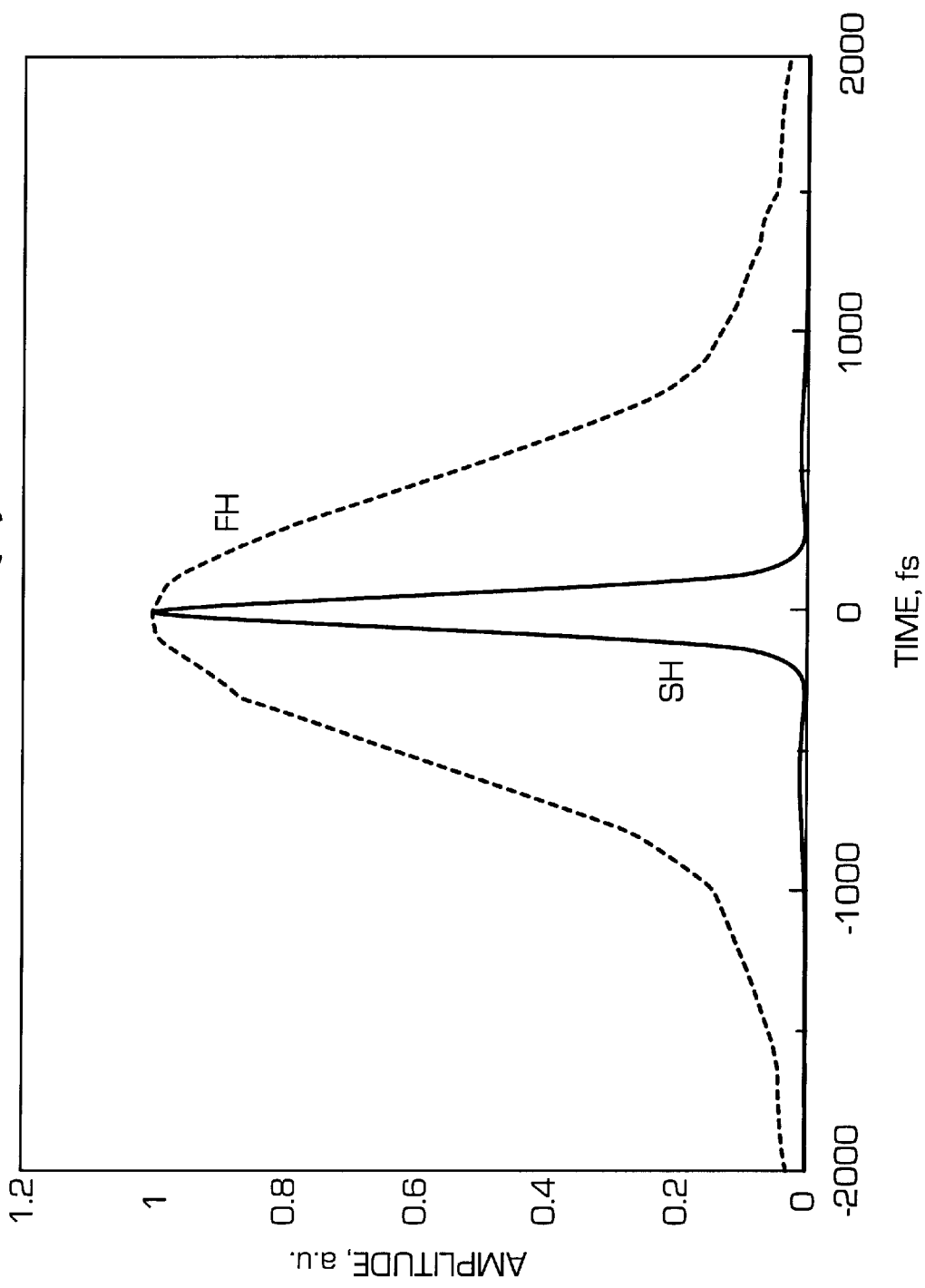

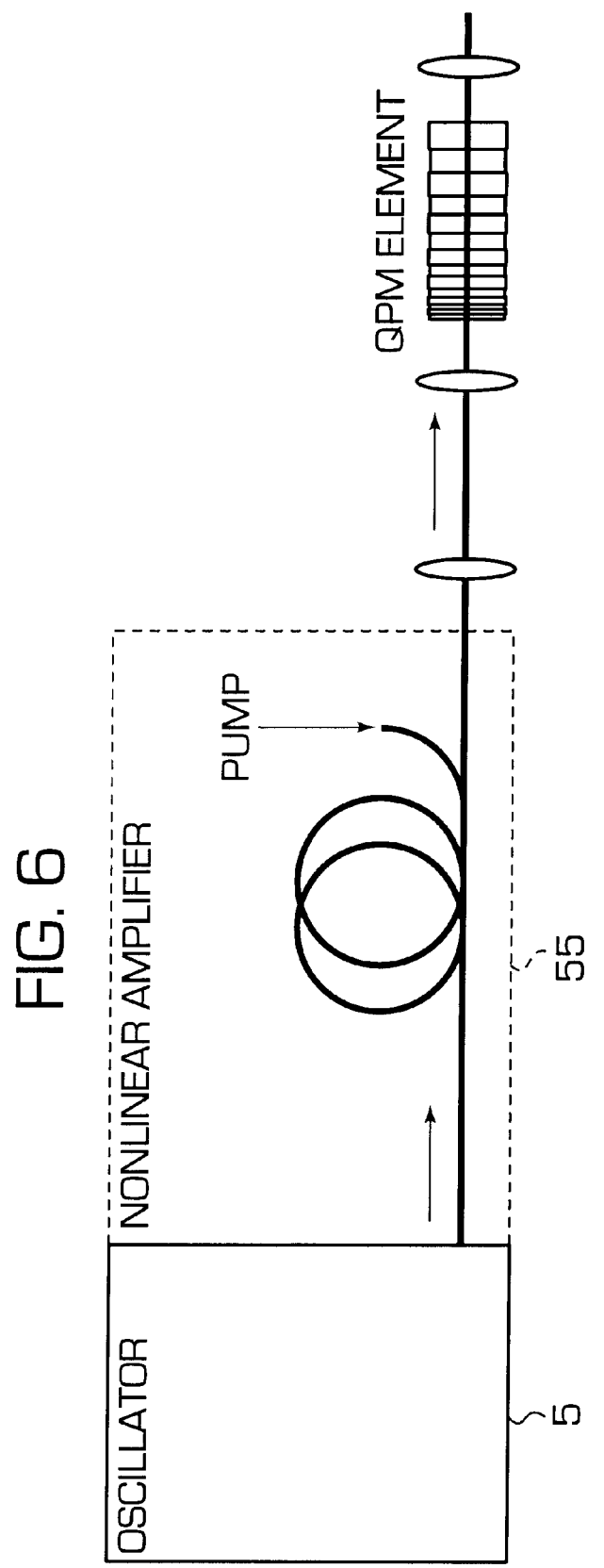

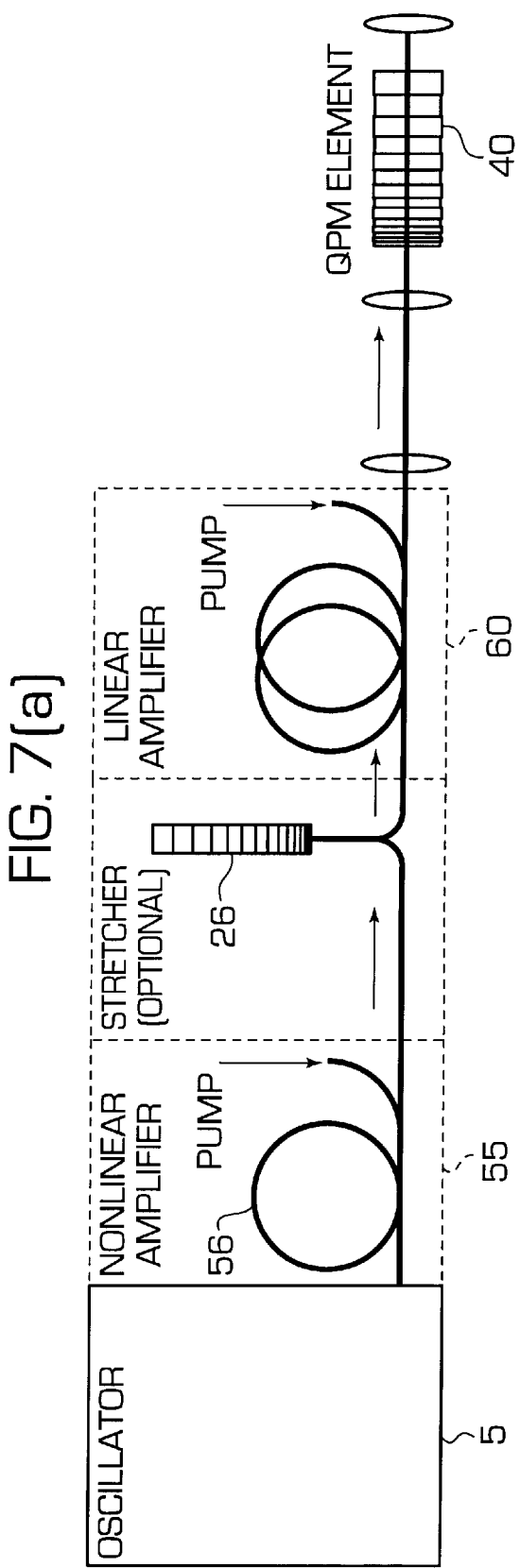

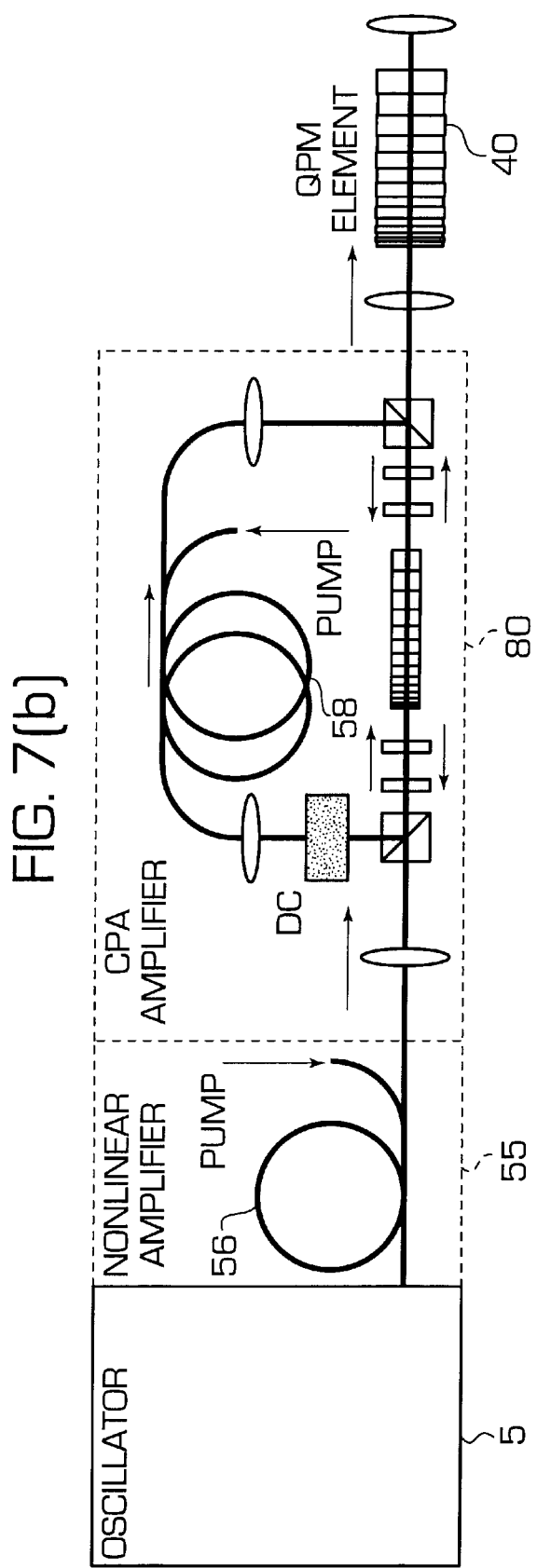

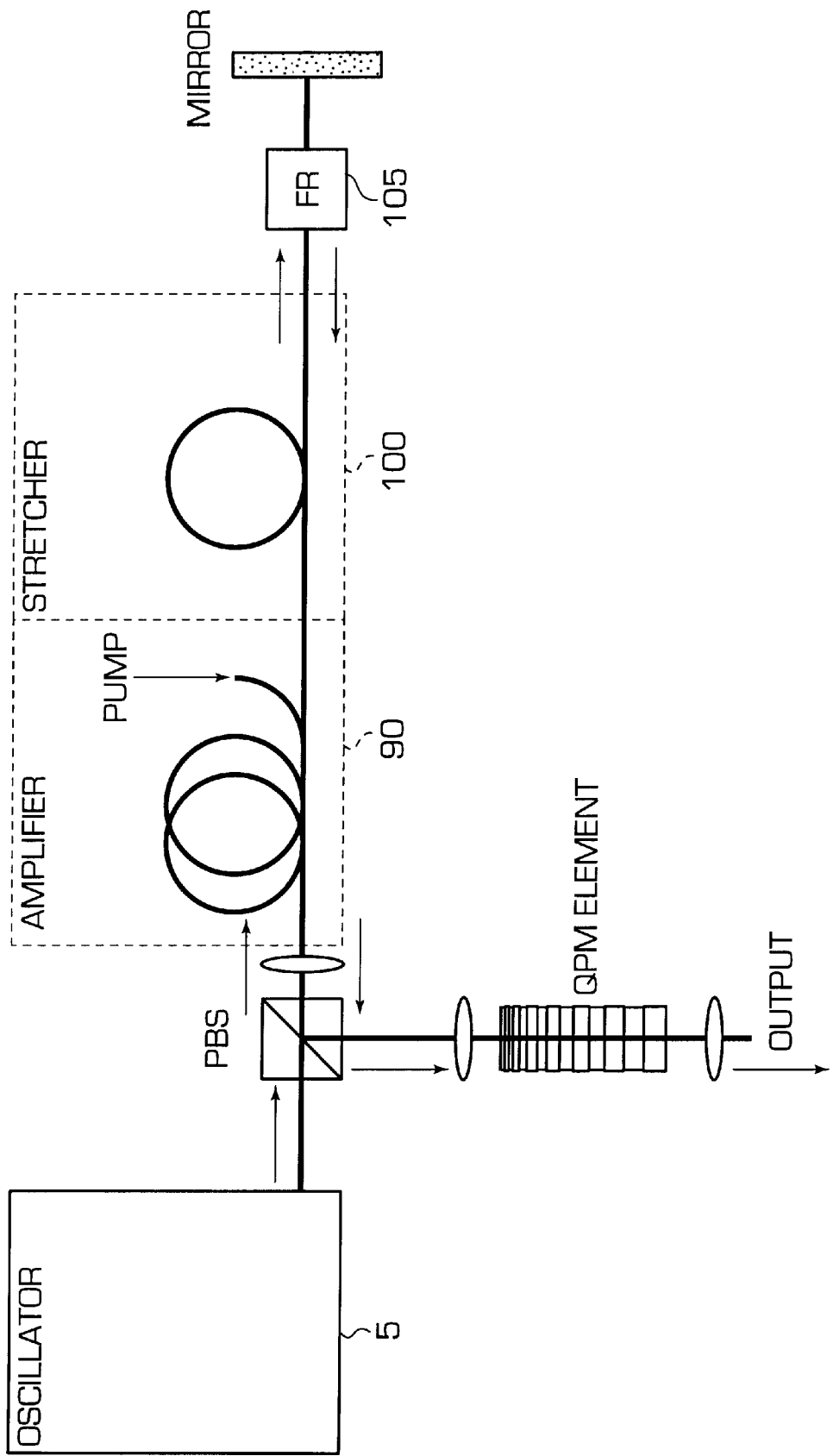

USE OF CHIRPED QUASI-PHASE-MATCHED MATERIALS IN CHIRPED PULSE AMPLIFICATION SYSTEMS

BACKGROUND OF THE INVENTION

Chirped pulse amplification is a general method for obtaining maximum ultrashort pulse energies from an optical amplifier (see, *Compression of Amplified Chirped Optical Pulses,* D. Strickland and G. Mouro, Opt. Commun. 56, 219 (1985)). Maximum pulse energy in a particular amplifying medium is determined by the value of the saturation fluence. However, for a propagating ultrashort optical pulse, unacceptably high peak intensity can be reached at pulse fluencies well below the saturation fluence of the amplification material. Therefore, for the majority of amplifying media it is necessary to stretch ultrashort pulses prior to amplification. The initial ultrashort duration must be restored after the amplification by recompressing the stretched pulse. Use of chirped pulse amplification allows a reduction in the peak intensities of pulses in the amplifier and avoidance of nonlinear distortions in ultrashort pulses.

A rare-earth doped fiber amplifier is one example of an amplifying medium which provides exceptional technological advantages. A fiber-based laser or amplifier can be directly pumped by a laser diode, and a compact and robust device can be designed therefrom. The value of the saturation fluence in single-mode Er-doped fibers permits optical pulses with energies in the 10 to 100 $\mu J$ range. However, direct amplification of subpicosecond optical pulses in, e.g. Er-doped fiber, is possible only for energies of up to approximately the nanojoule level. In order to take advantage of the full capability of the fiber, it is necessary to stretch optical pulses prior to amplification up to the duration of approximately 0.1 ns to 1 ns or longer.

In the conventional implementation of chirped pulse amplification, diffraction-grating-based ultrashort-pulse stretchers and compressors are used, as described by P. Maine et al. in *Generation of Ultrahigh Peak Power Pulses by Chirped Pulse Amplification,* IEEE J. Quantum Elect. Vol. 24, No. 2, Feb. 1988. These diffraction-grating arrangements are particularly useful for recompressing high energy pulses, because diffraction gratings are not susceptible to optical damage and nonlinear effects up to very high peak intensities. Recompression of ultrashort pulses with energies above the 1 J level have been achieved with such pulse compressors. The disadvantage of diffraction-grating stretchers and compressors is the large size of these arrangements. For stretching pulses to nanosecond durations and longer, diffraction-grating based systems can reach several meters in length. Even the most compact arrangements typically have a length of tens of centimeters. Additionally, exact compensation of the pulse phase requires very precise alignment of the arrangement, which is not a trivial task. The alignment requirements make such devices unsuitable for mass production.

Chirped Bragg-grating pulse stretchers and compressors have been proposed recently as a compact replacement for bulk diffraction-grating arrangements (See, U.S. Pat. No. 5,499,134, referred to hereinafter as "the '134 patent"). Chirped gratings can be directly written into the core of an optical fiber. Very compact arrangements with chirped fiber Bragg-gratings can deliver longer stretched pulses compared to diffraction-grating devices. The length L of a chirped fiber-grating is directly related to the duration $\Delta T$ of a stretched pulse: $\Delta \tau = 2L/v_g$ (provided that spectral bandwidths of the pulse and the grating are perfectly overlapped). Here $v_g$ is the group velocity of light in the grating fiber. For example, nanosecond stretched pulses can be obtained with a 10 cm long fiber-grating. Such chirped fiber Bragg-grating devices are ideally compatible with fiber amplifier technology and provide compact implementations of all-fiber chirped pulse amplification techniques (See, A. Galvanauskas et al., *All-fiber Femtosecond Pulse Amplification Circuit Using Chirped Bragg Grating,* Appl. Phys. Lett., Vol. 66 (9), Feb. 27, 1995). One essential technological advantage of fiber-grating devices is that, similar to semiconductor circuit technology, such devices can be mass-produced at relatively low cost by using phase-mask technology.

Chirped fiber-grating compressors can produce pulsed outputs with substantially higher energies than direct amplification in an optical fiber. Fiber gratings have 4 to 6 orders of magnitude higher dispersion compared to a standard fiber. Consequently, the propagation length for a recompressed pulse in a grating fiber is substantially shorter than in an amplifier fiber and nonlinear effects occur at substantially higher peak powers.

However, the obtainable energies from a fiber-grating compressor are limited compared to a diffraction-grating compressor. The essential disadvantage is that an all-fiber chirped pulse amplification (CPA) system based on a fiber-grating compressor can provide pulses with maximum energies only of about 100 nJ, which is more than 100 times lower than the saturation-fluence limit for a fiber amplifier. Therefore, using a fiber-grating compressor effectively prevents full utilization of the fiber amplifier.

There are a number of applications where use of high pulse energies is essential. One example is a fiber amplifier CPA-based optical parametric generation system for producing a broadly tunable wavelength output. Optical parametric generation can be achieved only with pump energies exceeding a certain threshold, which typically is higher than can be delivered with a fiber-grating compressor. This energy requirement makes it necessary to resort to diffraction-grating compressors, which are disadvantageous for the reasons described above.

One solution would be to use bulk chirped Bragg-grating devices which could accept large beams and, subsequently, to eliminate nonlinear-effect limitations. However, such devices have not yet been achieved due to the substantial technological problems of writing a Bragg-grating with the required characteristics into a large volume of photosensitive material.

A partial solution was suggested in U.S. Pat. No. 5,696, 782.

Disadvantages of using a diffraction-grating compressor can be partially alleviated if a hybrid scheme is used. In the '782 patent, the fiber CPA system includes a fiber-grating stretcher and compressor and an additional diffraction-grating compressor immediately following the fiber-grating compressor. The function of the fiber-grating compressor is to compress the amplified pulses only partially in order to reduce the size of the diffraction-grating compressor and to circumvent the nonlinear-effect limitations of the fiber-grating compressor. One disadvantage of this scheme is that technological problems related to the size and alignment of the diffraction-grating device are merely reduced, but not eliminated. Another disadvantage is that pulse energy losses are typically high after passing two compressors. These losses increase if a frequency conversion, such as a second-harmonic generation, is required after the pulse compression (e.g. for pumping and optical parametric generation).

In a chirped quasi-phase-matched (QPM) crystal, the ability to perform chirp compensation and frequency conversion is based on two key features of the crystal. First, as is typical for any nonlinear material, group velocities of the fundamental-wavelength pulse and of the second-harmonic pulse are different along the same propagation path, resulting in temporal walk-off between these two pulses. Second, in a chirped QPM crystal, second-harmonic generation for different input wavelengths is localized at different spatial positions along the pulse propagation path. As a result, a bandwidth-limited pulse at the fundamental wavelength, launched into such a crystal, will produce second-harmonic pulses with a frequency chirp. The duration of this second-harmonic (SH) pulse $\Delta T$ is determined by the magnitude of the group-velocity walk-off: $\Delta T = L/v_{SH} - L/v_{Fund}$. Here L is the length of the crystal and $v_{SH}$, $v_{Fund}$ are the group-velocities at second-harmonic and fundamental harmonics, respectively. The frequency-bandwidth $\Delta v$ of the SH pulse is given by the magnitude of the QPM period variation (QPM chirp bandwidth). Equivalent frequency chirp of an optical pulse can be produced by group-velocity dispersion equal to $\Delta T/\Delta v$. Note that, for the two opposite directions of propagation, the frequency chirp of the second-harmonic pulses produced therefrom have opposite signs.

However, QPM crystals cannot be used as direct replacements for conventional pulse stretchers and compressors. One essential difference is that they do not provide any actual group-velocity dispersion (ignoring the small intrinsic dispersion of a nonlinear material). Therefore, fundamental pulses cannot be stretched, as is necessary for implementing a CPA scheme. Also, due to the limited values of the group-velocity walkoff and due to the technological limitations on the achievable QPM crystal lengths, the amount of stretched-pulse compensation on the SH pulse is substantially smaller than that achievable with fiber-grating or diffraction-grating compressors.

In U.S. patent application Ser. No. 08/824,032, Arbore et al. disclose that a quasi-phase-matched (QPM) second harmonic generator (SHG) with QPM period chirped along the crystal length, in effect, provides group velocity dispersion (GVD) at the second-harmonic wavelength. This property allows construction of unique devices for simultaneous second-harmonic generation and temporal stretching or compression of the second-harmonic output with respect to the fundamental input pulses.

In U.S. Pat. No. 5,696,782, A. Galvanauskas, M. Arbore, M. Fejer and D. Harter disclose the use of a chirped QPM element in a CPA system. The present application relates to the use of chirped QPM elements in fiber-based systems.

All of the above-mentioned articles, patents and patent applications are hereby incorporated herein by reference.

SUMMARY OF THE INVENTION

It is an object of the present invention to circumvent the above described limitations on the peak-power and energy of the recompressed pulses obtained from a fiber-grating compressor by using a chirped-period quasi-phase-matched crystal as a final compressing element. This allows a substantial increase in the energies of frequency-converted and recompressed pulses obtained from a fiber-grating based chirped pulse amplification system, while preserving the compactness of the stretcher/compressor arrangement.

It is a further object of the invention to use chirped-period quasi-phase-matched materials to compensate both linear and nonlinear frequency chirp of the fundamental wavelength pulses obtained from a fiber amplifier, in order to obtain second-harmonic pulses with durations close to or at the bandwidth-limit. This allows elimination of a variety of problems arising in a fiber chirped pulse amplification system, such as correction of nonlinear chirp originating from the oscillator, caused by the phase mismatch between the stretcher and compressor or the nonlinear modulation in a fiber amplifier. Also, the capability to compensate for an arbitrary chirp allows exploitation of nonlinear spectral broadening techniques for obtaining shorter second-harmonic pulses and to alleviation of limitations imposed by the limited amplification bandwidth.

It is another object of the present invention to achieve adjustable phase-characteristics of a chirped QPM crystal in order to allow for certain tolerances and uncertainties in the design and fabrication of a pulse amplification system. Also, this adjustability facilitates the precise chirp compensation for achieving the shortest pulse durations. This adjustment can be implemented by taking advantage of the two-dimensional nature of a QPM structure. This is in contrast to the fiber-grating compressors, which are essentially single-dimensional structures.

It is a further object of the present invention to use chirped QPM crystal to enable more compact, robust and simple pulse amplification systems.

It is also an object of the present invention to employ chirped QPM crystals to achieve maximum energy throughput and minimum loss in pulse quality and duration while compressing and frequency-converting amplified output.

The objects of the invention can be accomplished by using a combined compressor, which consists of a chirped grating compressor and a chirped QPM crystal.

Other and further objects of the present invention will be apparent from the following description of the preferred embodiments and the accompanying drawings.

BRIEF DESCRIPTION OF THE DRAWINGS

FIG. 4 is a diagram showing a third embodiment of the present invention, wherein a pulse stretcher is not used.

FIG. 5(a) depicts a fourth embodiment of the present invention, wherein a compressor is omitted between the amplifier and the chirped QPM element.

FIG. 5(b) depicts a fifth embodiment of the present invention, wherein a nonlinear compressor is placed in front of the chirped QPM element.

FIG. 5(c) illustrates autocorrelation traces of the initial pulse at 1560 nm and the final compressed pulse at 780 nm.

FIG. 6 depicts a sixth embodiment of the present invention, wherein a fiber amplifier is exploited as a nonlinear element.

FIGS. 7(a) and 7(b) depict seventh and eighth embodiments of the present invention wherein a nonlinear fiber-amplifier is placed in front of a linear amplification stage.

FIGS. 7(c) and 7(d) depict embodiments similar to those of FIGS. 7(a) and 7(b), wherein a double-pass arrangement is employed.

DETAILED DESCRIPTION OF THE PREFERRED EMBODIMENTS

Figure 1:
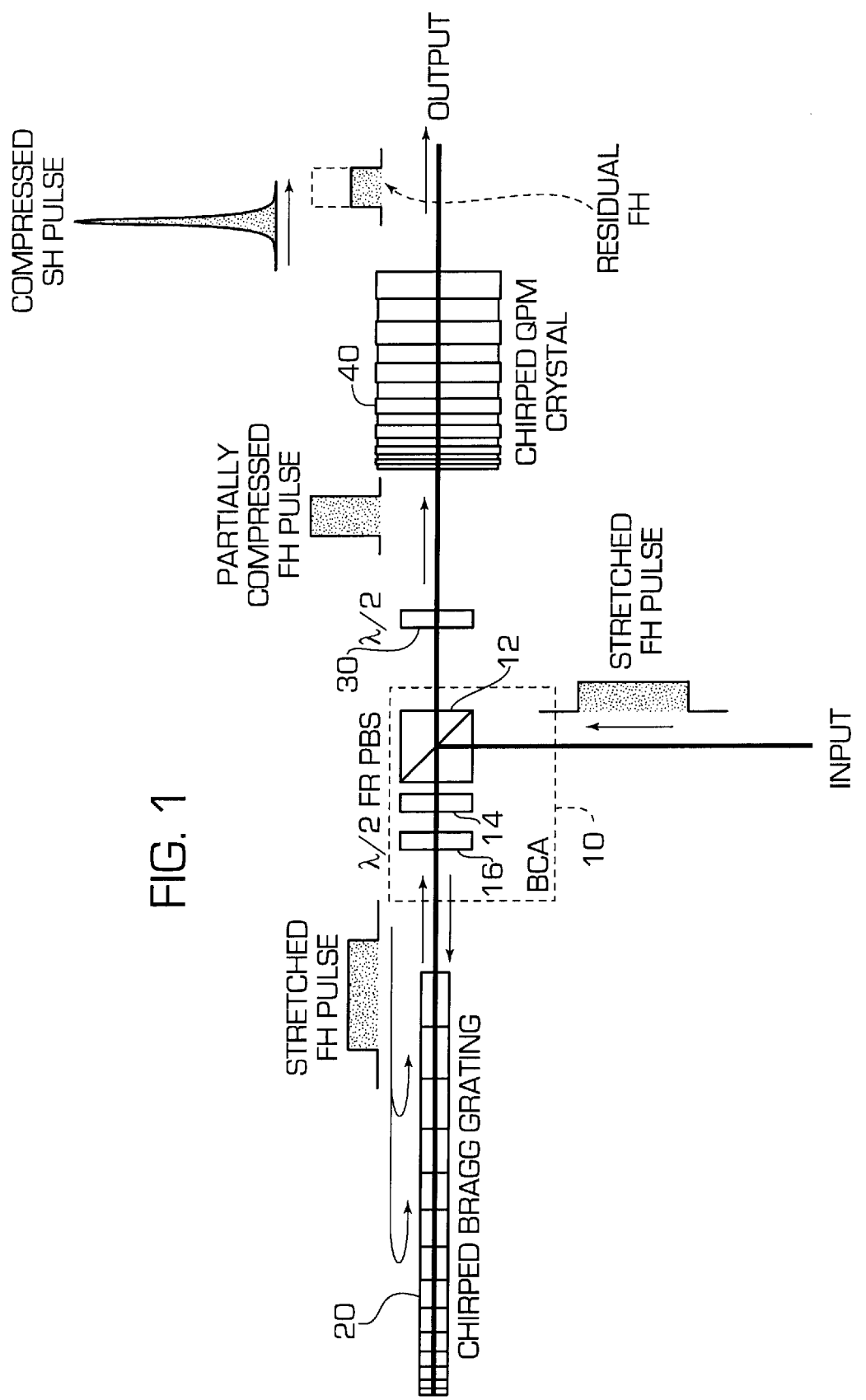
FIG. 1 depicts the combination of a chirped grating compressor and a chirped QPM crystal, according to a first embodiment of the present invention.

The combination of a chirped grating compressor and a chirped QPM crystal according to the first embodiment of the present invention will be described with reference to FIG. 1. The stretched first harmonic (FH) pulse is applied to a beam coupling arrangement (BCA) 10 which separates incident and reflected beams from a chirped Bragg grating 20. In the example shown in FIG. 1, BCA 10 comprises a polarizing beamsplitter (PBS) 12, a Faraday rotator (FR) 14, and a half-waveplate ($\lambda$/2) 16. In the example of FIG. 1, another half-waveplate ($\lambda$/2) 30 is placed in the path between the BCA 10 and the chirped QPM crystal 40. The half-waveplates 16 and 30 are used in the example of FIG. 1 to ensure the correct polarization into the grating 20 and into the QPM element 40, respectively. Half-waveplates 16 and 30 facilitate the implementation of the present embodiment, but are not essential.

The stretched optical pulses input to the BCA 10 are first launched into the chirped Bragg grating 20. The duration of the input stretched pulses and the dispersion of the chirped Bragg grating 20 are chosen in such a way that the pulse compression in the grating is incomplete. The pulses at the output of the chirped Bragg grating 20 therefore have lower pulse peak powers compared to complete compression, consequently alleviating nonlinear-effect limitations on the pulse energy.

The partially recompressed pulses are launched into a chirped QPM crystal 40 via the BCA 10. The simultaneous second-harmonic generation and compression of the second harmonic (SH) output is accomplished in the chirped QPM crystal 40. Bandwidth-limited SH output can be obtained if the residual chirp of the fundamental-wavelength pulses from grating compressor 20 precisely matches the designed phase characteristics of the chirped QPM crystal 40.

In general, the chirped Bragg grating 20 can be a bulk grating. However, the combined compressor exemplified in FIG. 1 is particularly advantageous if the chirped Bragg grating 20 is a chirped fiber-grating.

Figure 2:
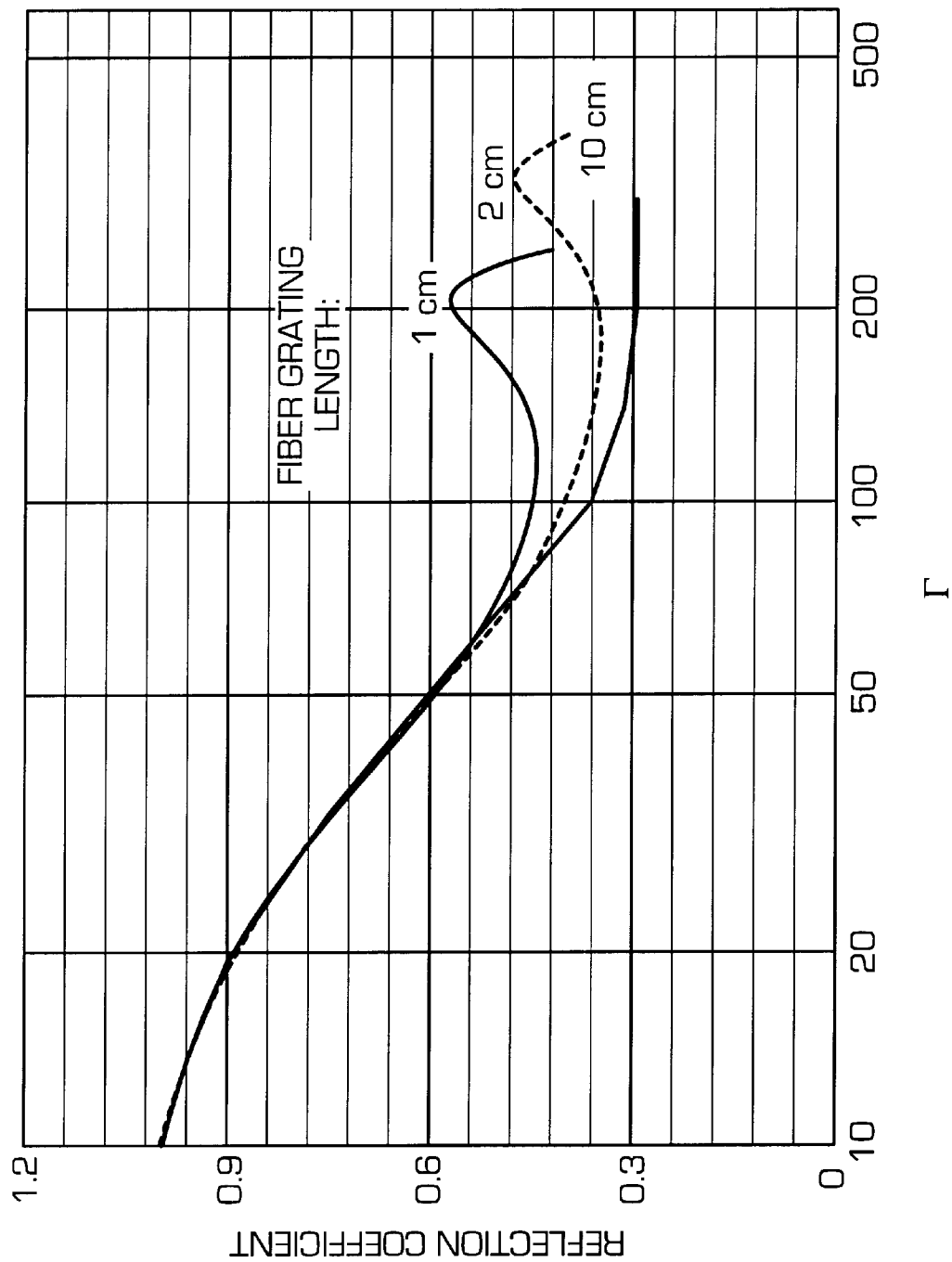
FIG. 2 is a graph demonstrating the limitations on the recompressed pulse energy from a fiber-grating compressor.

Limitations on the recompressed pulse energy from a fiber-grating compressor are shown in FIG. 2. The reflectivity for chirped fiber gratings of 1 cm, 2 cm and 10 cm lengths is plotted as a function of a dimensionless parameter $\Gamma$. The product of both pulse peak power $I_0$ and fiber-grating length L is included in the dimensionless parameter $\Gamma=4\pi n_2 L I_0 / \lambda A_{eff}$. Here $A_{eff}$ is fiber core area, $n_2$ is the Kerr index of the fiber and $\lambda$ is the wavelength. This plot reveals the scaling rules with respect to grating length and pulse peak power. The effect of nonlinear distortions is observable for all three curves at $\Gamma>10$, where the reflectivities of all three gratings decrease with increasing $\Gamma$.

As shown in FIG. 2, all three curves overlap at low $\Gamma$ values. This indicates that, at the threshold for nonlinear distortions (at $\Gamma\approx10$), the obtainable peak powers and, consequently, energies scale linearly with the grating length and with the recompressed –pulse peak power. For example, for a 10 cm grating in a standard fiber, undistorted 500 fs pulses can be obtained with energies of up to 50 nJ. With a 2 cm grating 5 times higher pulse energies are obtainable. It is obvious that similar scaling applies for pulse durations: pulse energy at the nonlinear effect threshold for 5 ps pulses is approximately 10 times higher than for 500 fs.

This analysis reveals that, with a proper choice of the fiber-grating length and with sufficiently long chirped QPM crystals, recompressed SH pulse energies can reach several microjoules. One particular application that would greatly benefit from the present invention is a compact fiber-based optical parametric generation system for the generation of broadly wavelength-tunable femtosecond pulses.

Note that possible phase distortions due to the third-order optical nonlinearity of the material in the chirped QPM crystal are not a limitation. First, second-order optical nonlinearity is much higher compared to the third-order nonlinearity. Second, excessive peak powers in a nonlinear crystal can be avoided by simply enlarging the beam in the crystal.

One advantage of employing chirped QPM crystals for compensating nonlinear chirp follows from the fact that the quasi-phase-matching period is much longer than the Bragg-grating period. The Bragg-grating period $\Lambda_B$ is determined by the refractive index of the material n: $2n\Lambda_B=\lambda$. The domain-reversal period $\Lambda_{QPM}$ in a periodically poled QPM material is determined by the difference of the refractive indices for fundamental and second-harmonic wavelengths $\Delta n$: $2\Delta n \Lambda_{QPM}=\lambda$. This yields a one to two order of magnitude difference between these periods. For example, the Bragg period at 1550 nm in a glass fiber is ~500 nm, whereas the QPM period for lithium niobate for second harmonic generation (SHG) at 1550 nm is ~20 $\mu$m. Due to existing photolithographical limitations on the precision of writing such gratings, designing arbitrarily chirped Bragg gratings is at the state-of-the-art limit of technological capabilities. In contrast, arbitrarily chirped QPM gratings can easily be implemented by using standard lithographic techniques.

Figure 3:
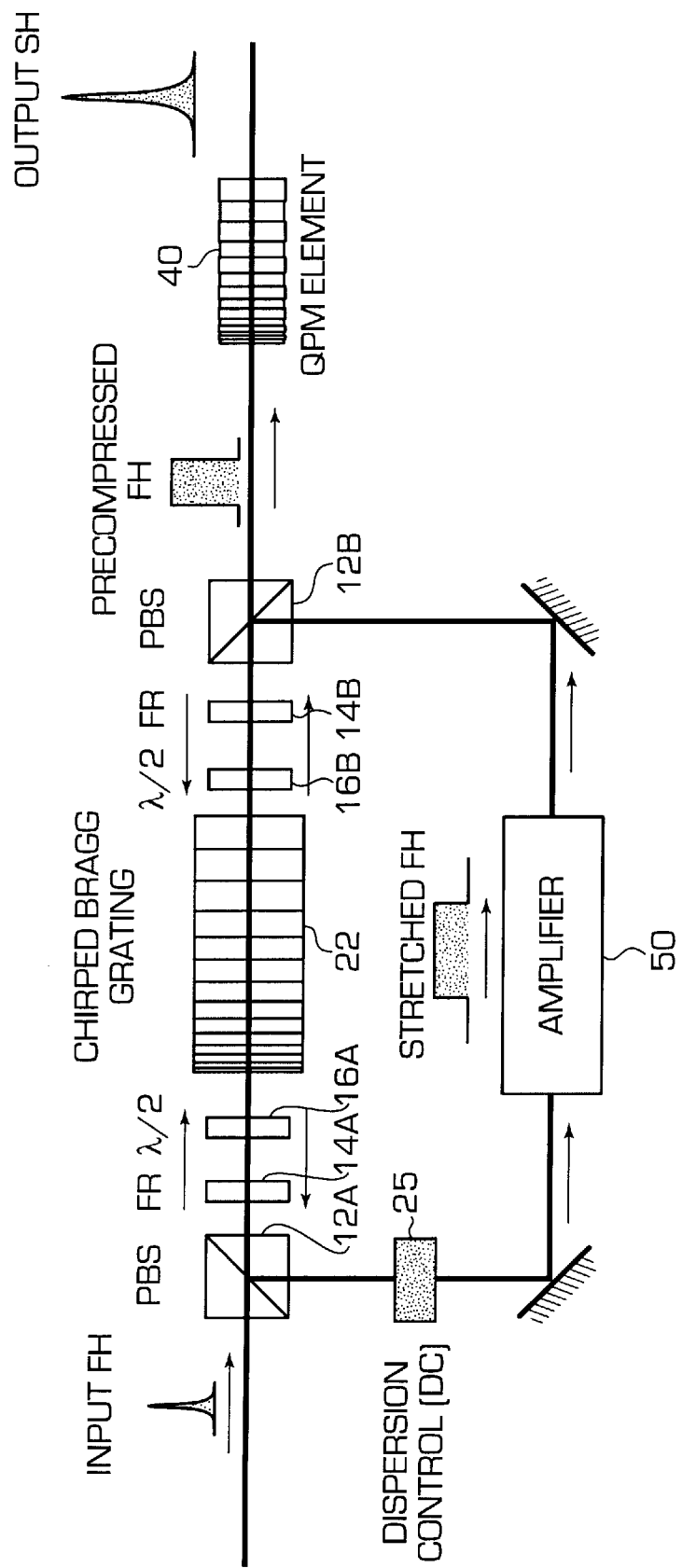
FIG. 3 is a diagram depicting the general scheme according to a second embodiment of the present invention.

The general scheme for implementing the second embodiment of the present invention is shown in FIG. 3. According to the second embodiment, pulses at the fundamental wavelength are both stretched and compressed. The system of the second embodiment includes a source of ultrashort optical pulses (not shown), a chirped grating stretcher/compressor 22, an element for dispersion control 25, an optical amplifier 50, various optical components arranged in the optical path to separate incident and reflected beams at the chirped grating stretcher/compressor 22, and a chirped QPM element 40. The optical amplifier 50 is preferably a fiber amplifier, and can consist of one or several stages.

The arrangement shown in FIG. 3 is similar to the scheme described in the aforementioned '134 patent with the important exception of the chirped QPM element 40. The choice of the optical components in the suggested scheme and their arrangements are discussed in detail in the text of the '134 patent. The amplification system of the second embodiment can contain a single stretcher/compressor grating 22 or two separate gratings, one for stretching and another for compressing the pulse. The gratings are preferably chirped fiber gratings.

Dispersion control can be accomplished by using, for example, dispersion-compensating fiber with a positive sign of group-velocity dispersion. However, in contrast to the arrangement disclosed in the '134 patent, when a dispersion compensating fiber is used as dispersion control element 25 in the second embodiment of the present invention, the fiber is set to provide the non-zero net dispersion of the total system. This non-zero net dispersion is necessary in order to produce a small and controllable amount of stretched-pulse chirp at the output of the grating stretcher/compressor 22. This residual chirp is then completely or partially compensated at the second-harmonic wavelength through the action of the chirped QPM crystal 40. Alternatively, the required residual chirp can result from a mismatch between the phase characteristics of the stretcher and compressor gratings (i.e., when the chirped Bragg grating 22 comprises two separate gratings).

The separation of incident and reflected beams can be accomplished using a variety of components, which may include 50:50 beamsplitters, optical circulators, polarizing beamsplitters with Faraday rotator elements, etc. The exemplary embodiment of FIG. 3 utilizes a polarizing beam splitter 12A, a Faraday rotator 14A and a half-waveplate 16A at the stretcher side of the chirped Bragg grating stretcher/compressor 22, and a polarizing beam splitter 12B, a Faraday rotator 14B and a half-waveplate 16B at the compressor side of the chirped Bragg grating stretcher/compressor 22.

One advantage of the arrangement shown in FIG. 3 is that the same grating 22 is used both for stretching and recompressing. Imperfections in the grating 22 (e.g., irregularities in the grating period or variations of the refractive index along the grating 22) will affect the quality of the reflected pulses. However, if the same grating 22 is used for stretching and recompressing, the effect of longitudinal irregularities will be canceled, and distortion of the recompressed pulses will be minimized.

The technological attractiveness of the inventive combined compressor is that both the fiber-grating stretcher/compressor 22 and the chirped QPM element 40 can be mass-produced using photolithography-based technologies.

A variety of materials are suitable for fabricating the chirped quasi-phase-matched nonlinear element 40. To achieve high energies, it is preferable to use a bulk crystal rather than a waveguide element, due to the absence in the former of limitations on the beam size and the coupling losses into a waveguide. However, waveguide can be preferable at low pulse energies, when high conversion efficiency can be achieved at relatively low input peak powers due to the confinement of the propagating mode. The nonlinear crystal could be, for example, periodically poled lithium niobate (PPLN), periodically poled lithium tantalate (PPLT), or other periodically poled ferroelectric materials. Other materials having similar properties could also be used.

It is important to emphasize that the use of both stretching and compression, as is shown in FIG. 3, is essential for achieving maximum pulse energies from a fiber amplifier. As explained previously, saturation-fluence limited amplification requires stretched pulses with durations of at least hundreds of picoseconds. It is unlikely that any chirped QPM crystal could compensate for such a large chirp. This would require unrealistically large values of the group-velocity mismatch and the length of the QPM crystal. Therefore, the use of a compressor allows a reduction in the chirp of the fundamental-wavelength pulses down to the level which can be compensated without difficulty using available QPM materials.

According to a third embodiment of the present invention shown in FIG. 4, a pulse stretcher is not used. The details of implementing the amplification scheme of FIG. 4 (without the chirped QPM component) are given in the '134 patent. A tunable laser diode 70 directly provides chirped broad bandwidth pulses with characteristics suitable for chirped pulse amplification up to the saturation-fluence limited energies. The stretched pulses are applied to the amplifier 50, and the amplified pulses are then applied to the chirped Bragg compressor 25 via polarizer beam splitter 12C. The compressed pulses output from the chirped Bragg compressor 25 are deflected towards the QPM element 40 by the PBS 12C.

A fourth embodiment of the present invention is shown in FIG. 5(a). According to the fourth embodiment, the grating compressor stage is eliminated altogether. Prior to amplification, the pulses provided by oscillator 5 are stretched at the fundamental wavelength by a small amount in the stretcher 26. While a fiber-grating stretcher can be used, because only a small amount of stretching is required it is preferable to use a segment of standard fiber as a stretcher, thus providing a simple and inexpensive arrangement. After amplification in amplifier 50, the stretching induced by the stretcher 26 is compensated by a chirped QPM element 40. The exact amount of stretching is determined by considering the trade-off between two goals: having an optical pulse peak power in an amplifier that is low enough to avoid nonlinear phase distortion; and having a pulse output peak power that is high enough to achieve a sufficient second-harmonic conversion efficiency. Experimental results indicate that, with ≈500 W–1 kW peak-power stretched pulses, both goals can be satisfied using a fiber amplifier and a PPLN as a bulk QPM material.

Alternatively, a pulsed oscillator (e.g. a mode-locked fiber laser) can be used as oscillator 5 to directly produce slightly chirped optical pulses, thus eliminating the need for the stretcher 26. The compressed second-harmonic pulses are generated by launching amplified pulses directly into the chirped QPM element 40. Due to the reasons discussed above, this alternative cannot provide the maximum, saturation-fluence limited pulse energies. However, this scheme can produce ultrashort pulses with energies substantially exceeding those obtainable directly from a fiber amplifier (without resorting to chirped pulse amplification) or a mode-locked fiber oscillator.

Because stretched-pulse durations from femtoseconds to several picoseconds can be compensated with a single QPM crystal, up to tens of nanojoule energies can be obtained with the system shown in FIG. 5(a). The advantage of this system is that, due to the absence of a compression stage, the amplifier design becomes even more compact and simple than the one shown in FIG. 3, which for certain applications can outweigh the limitations on the pulse energy. Also, the overall efficiency increases when both compressor and second-harmonic generator functions are combined in a single element. Additional energy losses, which are always associated with an additional pulse compressor, are completely eliminated in the system of the fourth embodiment.

According to a fifth embodiment of the present invention, shown in FIG. 5(b), a nonlinear compressor 27 is placed between the amplifier 50 and the chirped QPM element 40. The nonlinear compressor 27 produces shorter pulses through the broadening of their spectrum. Such broadening is advantageous, because the frequency-conversion bandwidth of the chirped QPM element 40 can be made arbitrarily large.

Typically, pulse bandwidth and, consequently, its duration are limited by the gain bandwidth of a linear fiber amplifier. A common method to broaden pulse bandwidth is to employ nonlinear effects such as self-phase modulation, soliton compression, stimulated Raman scattering, etc. This can be achieved by using bulk or waveguide structures (e.g. optical fibers or hollow waveguides). In general, a nonlinear compressor 27 can be placed immediately in front of the chirped QPM element 40 in any of the three embodiments shown in FIGS. 3, 4 and 5(b). However, it is technologically advantageous to use optical fibers as such nonlinear components. Typically, fibers can be used to produce controllable nonlinear effects on the energy scale from nanojoule to tens of nanojoules. Therefore, the use of a fiber as a nonlinear component is particularly advantageous in the embodiment of FIG. 5(b), wherein the typical outputs are in the nanojoule to tens of nanojoules energy range.

There are two distinct modes of using a chirped QPM element after a nonlinear element. If the nonlinear element comprises a positive-dispersion fiber, it produces a spectrally broadened and stretched output. By a proper choice of fiber and input pulse parameters, the induced chirp can be essentially linear. This chirp is compensated during second-harmonic generation in the QPM element 40. In this case, the phase characteristics of the chirped QPM crystal have to be designed to compensate only a linear chirp of a spectrally and temporally broadened fundamental pulse.

FIG. 5(c) illustrates experimental results achieved from an implementation of this aspect of the present invention. In FIG. 5(c), autocorrelation traces of the initial pulse at 1560 nm and the final compressed pulse at 780 nm are shown. The initial fundamental pulses have a 800 fs duration, and the second harmonic output is compressed down to 100 fs. The initial ≈4 nm bandwidth pulses from a fiber oscillator were stretched, amplified in an Er-doped fiber, recompressed and then launched into a length of positive dispersion fiber to produce 30 nm spectrally broadened pulses at 1560 nm. The spectrally broadened pulses were then compressed and frequency doubled in a chirped PPLN crystal. The set-up corresponds to the one shown in FIG. 3 with an additional nonlinear-compression fiber placed immediately before the chirped QPM element.

If a negative dispersion fiber is used for spectral broadening, its output is typically a compressed pulse (a soliton, for example), possibly with a certain amount of nonlinear frequency chirp. Furthermore, if the pulse energies are sufficiently high, then spectral broadening occurs effectively at distances shorter than the dispersion length. A nonlinear fiber amplifier can be made short enough to eliminate the effects of positive and negative dispersion and only the spectral broadening will be obtained. This produces a highly nonlinear chirp. The QPM crystal then has to be designed to compensate for this nonlinear frequency chirp of the spectrally broadened fundamental pulses.

Generally, the above is also valid for all other types of nonlinear spectral-broadening components used in the present invention, as is described further in the specification. Note that in all these cases, the chirped QPM crystal also performs the additional function of increasing the quality of the second-harmonic pulse. The low intensity pedestal and wings, the features which are the typical products of nonlinear effects, can be eliminated through the compensation of nonlinear chirp and the "cleaning" action of the SHG process.

The fiber-grating compressor itself, positioned as shown in FIG. 3 and FIG. 4, can serve as a nonlinear element. This allows an extension of the range of energies where nonlinear effects are controllable. As described earlier, for a fiber-grating, these energies are substantially higher than in a standard fiber. Additionally, the energies scale with the length of the grating. For different lengths of a nonlinear fiber-grating compressor, pulses in the range of 100 nJ to ~1 $\mu$J can be obtained. Furthermore, to optimize the system for achieving the highest energies, it may be advantageous to use two fiber-grating compressors. The first one, the longer one, serves as a linear compressor, and the second, the shorter one, as a nonlinear compressor.

FIG. 6 illustrates a general configuration according to the sixth embodiment of the present invention. As shown in FIG. 6, a fiber amplifier 55 itself can be exploited as a nonlinear element. In this embodiment, neither a linear pulse stretcher nor a linear compressor is used. Essentially, the system consists only of a pulse source (oscillator 5), a nonlinear amplifier 55, and a chirped QPM element 40. The energies in this embodiment are limited to the nanojoule range. The above discussion on various modes of operation of such a nonlinear element (depending on the dispersion magnitude and sign), and the subsequent linear and nonlinear chirp compensation with a QPM element, also applies to nonlinear fiber amplifiers. The primary advantage of the embodiment of FIG. 6 is its ultimate simplicity. Despite the limitations on pulse energies, it can provide a substantial advantage over the configurations capable of producing higher pulse energies but with increased complexity and size.

According to a seventh and an eighth embodiment of the present invention shown in FIGS. 7(a) and 7(b), respectively, a nonlinear fiber-amplifier is placed in front of a linear amplification stage. Such configurations allow both spectral broadening (pulse shortening) and higher pulse energies. In the seventh embodiment shown in FIG. 7(a), nonlinear amplifier 55 comprises a positive dispersion fiber 56. Pulses injected directly from the oscillator 5 are subsequently spectrally-broadened by the nonlinear effects in the positive dispersion fiber 56. The spectrally-broadened pulses are then stretched by an optional stretcher 28, and then launched into a linear amplifier 60 to further increase the pulse energy.

The optional stretcher 28, inserted between the two amplification stages, may be, for example, a segment of a positive dispersion fiber or a chirped fiber-grating. Note that this additional stretcher is optional if a positive dispersion fiber 56 is used, and serves solely to further increase the achievable pulse energy. Negative dispersion or a short-length nonlinear amplifier also can be used in this configuration, but in this case the stretcher between the two amplification stages is a necessary component.

The amplified pulses are directed into a chirped QPM element 40, where the induced chirp is compensated through the second-harmonic generation.

In the eighth embodiment shown in FIG. 7(b), the nonlinear amplifier stage 55 is followed by a complete CPA amplifier stage 80. Specifically, a CPA amplifier 80 is interposed between the nonlinear amplifier 55 and the QPM element 40. The CPA amplifier 80 may have, for example, the same arrangement as that shown in FIG. 3. In the configuration shown in FIG. 7(b), the exact type of nonlinear amplifier 55 plays no significant role (whether negative or positive dispersion or with a length shorter than the dispersion length), because the pulses output from the nonlinear element are stretched in chirped Bragg grating 22, amplified in fiber amplifier 58, compressed linearly in the chirped Bragg grating 22, and then launched into the QPM element 40.

The main advantage of the eighth embodiment shown in FIG. 7(b) over the seventh embodiment shown in FIG. 7(a) is the possibility of achieving energies up to the saturation-fluence limit of the fiber amplifier 58.

Figure 7D:
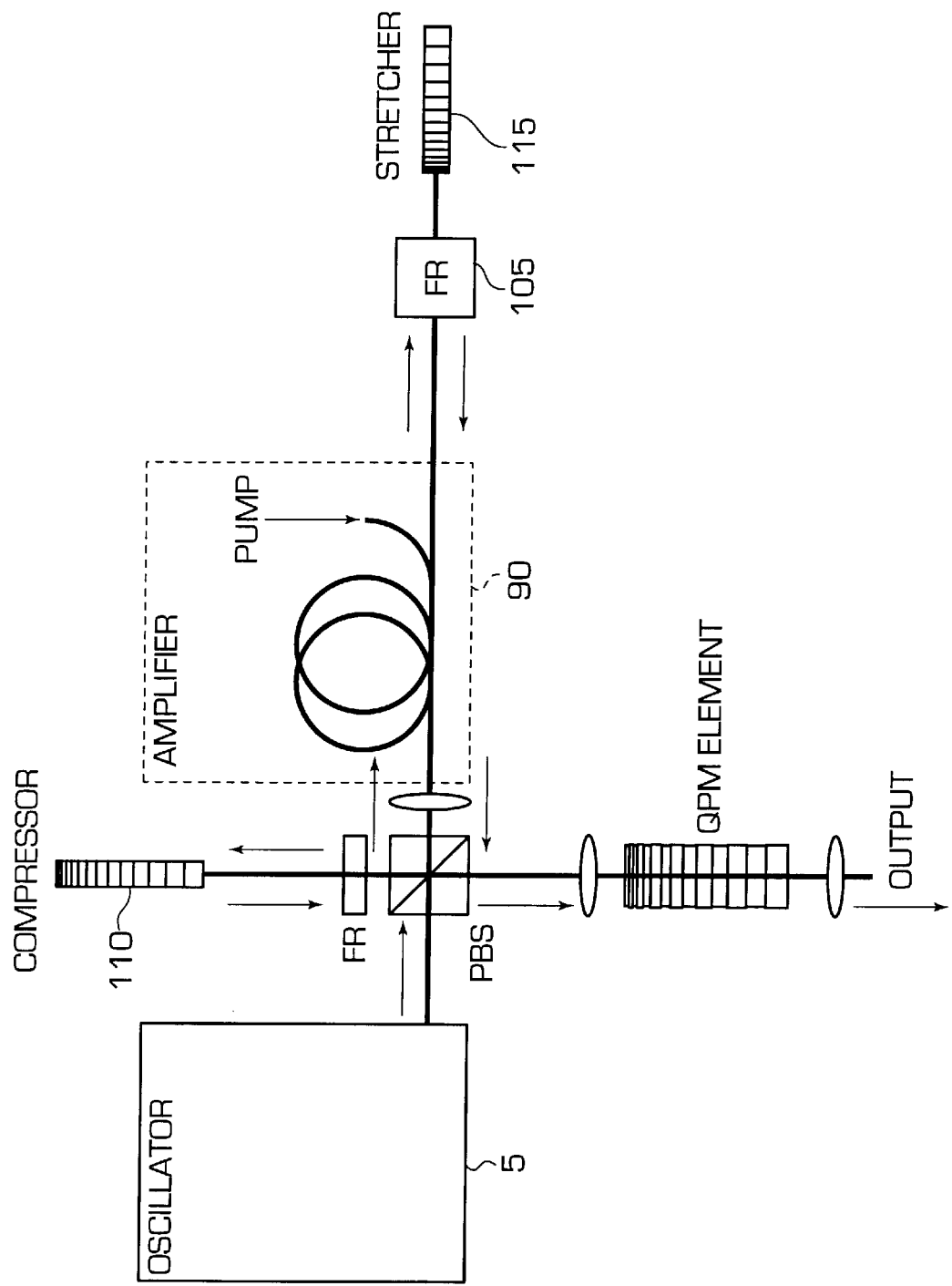

The configurations shown in FIGS. 7(a) and 7(b) can be equivalently substituted with more economic double-pass configurations as shown in FIGS. 7(c) and 7(d), respectively. The key advantage of the configurations shown in FIGS. 7(c) and 7(d) is that a single amplifier is used both as a nonlinear element and as a linear amplifier of a CPA arrangement.

In FIG. 7(c), an ultrashort pulse directly from oscillator 5 is injected into a fiber amplifier 90, where in the first pass it produces a spectral broadening. Then, after being stretched in stretcher 100, the pulse is amplified linearly in a second pass through the amplifier 90. Similar action is achieved in the set-up shown in FIG. 7(d), wherein the additional use of a compressor 110 allows for substantially longer stretched pulses and, subsequently, for larger pulse energies.

A Faraday rotator element 105 is optionally added to the configurations of FIGS. 7(c) and 7(d). It is well known that a Faraday rotator in a double-pass arrangement eliminates polarization sensitivity of the fiber components, which is highly desirable since second-harmonic generation is sensitive to the input polarization of the fundamental pulses.

Figure 8:
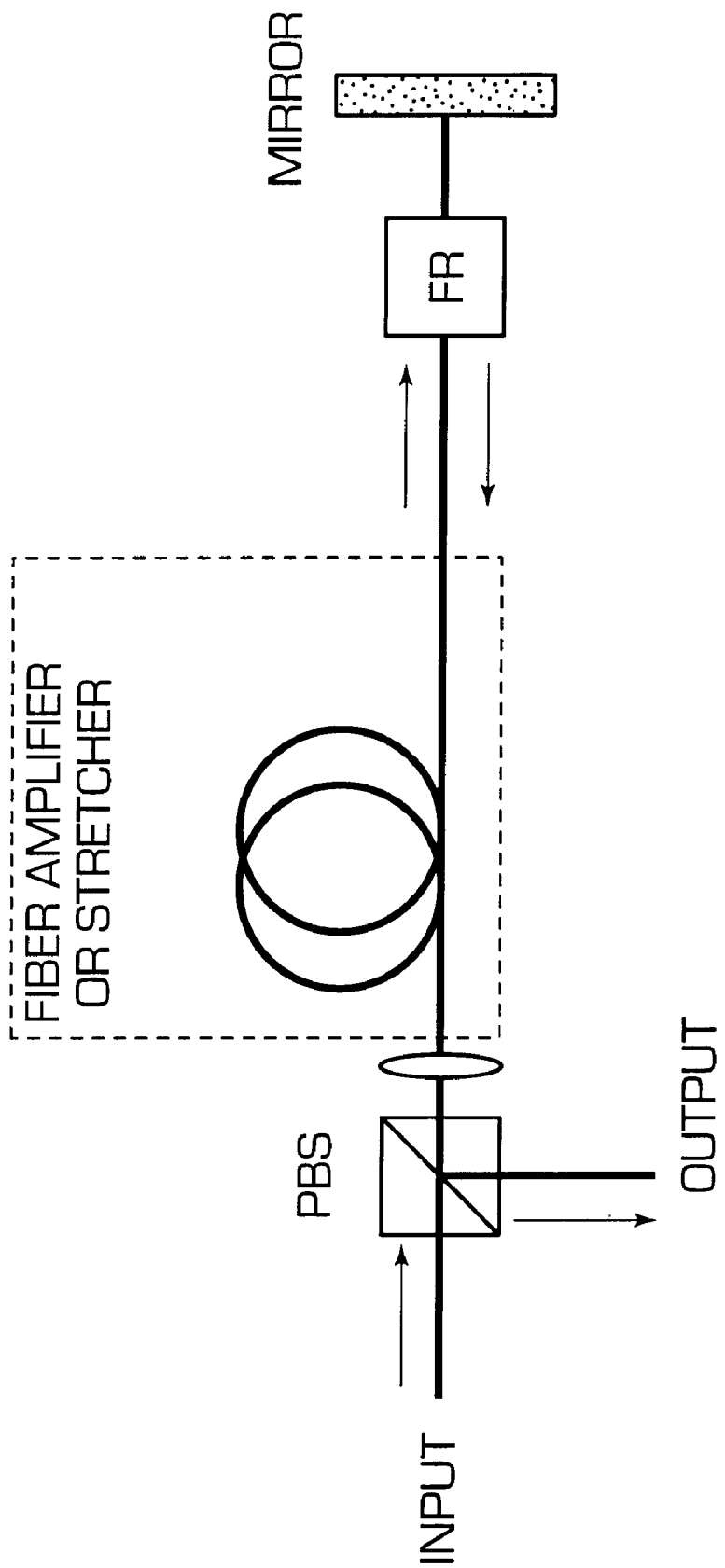
FIG. 8 depicts a basic double-pass arrangement for a fiber stretcher or a fiber amplifier.

In general, such known double-pass arrangements can be used with any linear or nonlinear amplifier or a linear stretcher, such as those shown in FIGS. 3–6. FIG. 8 shows a basic double-pass arrangement for a fiber stretcher or a fiber amplifier. Essentially, by using double-pass arrangements it is possible to eliminate polarization sensitivity in each of the above described implementations of the present invention.

The use of chirped QPM elements to compensate for nonlinear chirp of fundamental pulses has been partly described previously, emphasizing the necessity to compensate for the effects of spectral broadening in a nonlinear component. Such nonlinear-chirp compensation is also essential for other aspects of the present invention. For example, a need for nonlinear compensation might arise if there is a higher-order phase mismatch between a linear stretcher and a linear compressor. The mismatch might originate either due to manufacturing limitations of the two fiber-gratings or due to the use of a hybrid stretcher-compressor combination, such as a fiber stretcher and a grating compressor. Further, it might be necessary to compensate nonlinear chirp originating directly from an oscillator, such as a mode-locked laser or a tunable laser diode (disclosed in U.S. patent application Ser. No. 08/312,912, filed on Sep. 29, 1994, and incorporated herein by reference). Also, higher-order phase distortions might arise from the nonlinear modulation of the stretched pulses in a linear fiber amplifier, when operating at the highest allowable energies of the amplified pulses.

As was noted above, the two-dimensional nature of a QPM structure allows tunability of the phase-compensation characteristics. A QPM crystal has a determined length, width and thickness. A QPM grating is written along its length. For electrically poled materials like PPLN or PPLT, the QPM structure is homogeneous over the thickness of the crystal. However, the QPM parameters can be a function of the position along the crystal width (perpendicular to the beam propagation direction). If this parameter is the QPM period spectral width $\Delta v$, then the effective dispersion $\Delta T/\Delta v$ is also a function of the position along the width (for a fixed QPM length). Phase characteristics could be adjusted with such a crystal by simply translating it in the direction perpendicular to the optical beam. Such variable compensation can be implemented for both linear and nonlinear chirp of a fundamental pulse. For example, linear chirp of the QPM structure can be set to a fixed value when a quadratic chirp component is made a linear function of the position across the crystal face. In this case, the linear chirp of the fundamental pulse is essential for obtaining bandwidth-limited pulses with durations below ~100 fs.

Although the invention has been described and shown in terms of preferred embodiments thereof, it will be understood by those skilled in the art that changes in form and detail may be made therein without departing from the spirit and scope of the invention as defined in the appended claims.

What is claimed is:

1. A chirped pulse compression system comprising:
    a fiber-based compressor receiving and compressing signal pulses to thereby generate compressed signal pulses; and
    a chirped quasi-phase-matched crystal receiving and further compressing the compressed signal pulses.

2. The chirped pulse compression system of claim 1, wherein said fiber-based compressor comprises a chirped Bragg grating.

3. The chirped pulse compression system of claim 2, further comprising at least one half-waveplate disposed in the path between the chirped Bragg grating and the chirped quasi-phase-matched crystal.

4. The chirped pulse compression system of claim 2, wherein the chirped Bragg grating comprises a chirped fiber grating.

5. The chirped pulse compression system of claim 1, wherein said fiber-based compressor comprises a non-linear compressor.

6. The chirped pulse compression system of claim 5, wherein said fiber-based compressor comprises a dispersion fiber compressor.

7. The chirped pulse compression system of claim 1, further comprising a beam coupling arrangement which directs the signal pulses to said fiber-based compressor, receives the compressed signal pulses from said fiber-based compressor, and directs the compressed signal pulses to said chirped quasi-phase-matched crystal.

8. The chirped pulse compression system of claim 1, wherein the compressed pulses received by said quasi-phase-matched crystal are first harmonic pulses, and further-compressed second harmonic pulses are produced by said quasi-phase-matched crystal.

9. A chirped pulse amplification system comprising:
    an amplifier receiving and amplifying light pulses to thereby produce amplified pulses;
    a fiber-based compressor receiving and compressing the amplified pulses to thereby generate compressed pulses; and
    a quasi-phase-matched crystal receiving and further compressing the compressed pulses.

10. The chirped pulse amplification system of claim 9, further comprising a stretcher receiving and stretching the light pulses before being applied to the amplifier.

11. The chirped pulse amplification system of claim 10, further comprising a dispersion control element interposed between the stretcher and amplifier.

12. The chirped pulse amplification system of claim 11, further comprising a non-linear amplifier receiving and amplifying the light pulses before being applied to the stretcher.

13. The chirped pulse amplification system of claim 10, wherein said fiber-based compressor comprises a chirped grating and wherein said stretcher comprises a chirped grating.

14. The chirped pulse amplification system of claim 10, further comprising a pulse source generating the light pulses.

15. The chirped pulse amplification system of claim 9, wherein said amplifier is a fiber amplifier.

16. The chirped pulse amplification system of claim 9, wherein said amplifier is a multi-stage fiber amplifier.

17. The chirped pulse amplification system of claim 9, wherein the light pulses received by said amplifier are chirped pulses, and wherein the chirped pulse amplification system further comprises a pulse source generating the chirped pulses.

18. The chirped pulse amplification system of claim 17, wherein said pulse source is a tunable laser diode.

19. The chirped pulse amplification system of claim 9, wherein said fiber-based compressor is arranged in a double pass configuration.

20. The chirped pulse amplification system of claim 19, further comprising a beam coupling arrangement which directs the signal pulses to said fiber-based compressor, receives the compressed signal pulses from said fiber-based compressor, and directs the compressed signal pulses to said chirped quasi-phase-matched crystal.

21. A chirped pulse amplification system, comprising:
a chirped grating;
a first beam coupling arrangement directing input signal pulses to said chirped grating, receiving signal pulses which have been stretched by said chirped grating, and providing stretched pulses at an output thereof;
an amplifier receiving and amplifying the stretched pulses to thereby produce amplified pulses;
a second beam coupling arrangement receiving the amplified pulses, directing the amplified pulses to said chirped grating, receiving signal pulses which have been compressed by said chirped grating, and providing compressed pulses at an output thereof; and
a quasi-phase-matched crystal receiving and further compressing the compressed pulses.

22. The chirped pulse amplification system of claim 21, further comprising a dispersion control element interposed between the first beam coupling arrangement and the amplifier.

23. The chirped pulse amplification system of claim 21, further comprising a non-linear amplifier amplifying the input signal pulses before being applied to the first beam coupling arrangement.

24. A chirped pulse amplification system, comprising:
a pulse source generating chirped pulses;
an amplifier receiving and amplifying the chirped pulses to thereby provide amplified pulses;
a fiber-based compressor receiving and compressing the amplified pulses to thereby generate compressed signal pulses; and
a quasi-phase-matched crystal receiving and further compressing the compressed signal pulses.

25. The chirped pulse amplification system of claim 24, wherein said fiber-based compressor is arranged in a double pass configuration.

26. The chirped pulse amplification system of claim 25, further comprising a beam coupling arrangement which directs the signal pulses to said fiber-based compressor, receives the compressed signal pulses from said fiber-based compressor, and directs the compressed signal pulses to said chirped quasi-phase-matched crystal.

27. A chirped pulse amplification system, comprising:
a pulse source generating ultrashort pulses;
a fiber-based stretcher stretching the ultrashort pulses to thereby provide stretched pulses;
an amplifier receiving and amplifying the stretched pulses to thereby provide amplified pulses; and
a quasi-phase-matched crystal receiving and compressing the amplified pulses.

28. The chirped pulse amplification system of claim 27, further comprising a compressor interposed between the amplifier and the quasi-phase-matched crystal, and receiving and pre-compressing the amplified pulses before being applied to the quasi-phase-matched crystal.

29. The chirped pulse amplification system of claim 28, wherein said compressor comprises a nonlinear compressor.

30. The chirped pulse amplification system of claim 27, further comprising a non-linear amplifier interposed between the pulse source and the fiber-based stretcher.

31. The chirped pulse amplification system of claim 27, wherein said amplifier is a double-pass amplifier interposed between said pulse source and said fiber-based stretcher, so that said ultrashort pulses pass through said amplifier once before reaching the fiber-based stretcher, and again after being stretched by the fiber-based stretcher.

32. The chirped pulse amplification system of claim 31, further comprising a Faraday rotator interposed between the amplifier and the fiber-based stretcher.

33. A chirped pulse amplification system comprising:
a pulse source generating ultrashort pulses;
a nonlinear amplifier receiving and amplifying the ultrashort pulses to thereby provide amplified pulses; and
a quasi-phased-matched crystal receiving and compressing the amplified pulses.

34. The chirped pulse amplification system of claim 33, wherein said nonlinear amplifier is a fiber amplifier.

35. A chirped pulse amplification system, comprising:
a fiber amplifier receiving and amplifying light pulses to thereby produce amplified pulses;
a compressor receiving and compressing the amplified pulses to thereby generate compressed pulses; and
a quasi-phase-matched crystal receiving and further compressing the compressed pulses.

36. The chirped pulse amplification system of claim 35, further comprising a stretcher receiving and stretching the light pulses before being applied to the fiber amplifier.

37. The chirped pulse amplification system of claim 36, further comprising a dispersion control element interposed between the stretcher and fiber amplifier.

38. The chirped pulse amplification system of claim 37, further comprising a non-linear amplifier receiving and amplifying the light pulses before being applied to the stretcher.

39. The chirped pulse amplification system of claim 36, wherein said compressor comprises a chirped grating compressor and wherein said stretcher comprises a chirped grating stretcher.

40. The chirped pulse amplification system of claim 36, further comprising a pulse source generating the light pulses.

41. The chirped pulse amplification system of claim 35, wherein said compressor is a fiber amplifier.

42. The chirped pulse amplification system of claim 35, wherein said fiber amplifier is a multistage fiber amplifier.

43. The chirped pulse amplification system of claim 35, wherein the light pulses received by said fiber amplifier are chirped pulses, and wherein the chirped pulse amplification system further comprises a pulse source generating the chirped pulses.

44. The chirped pulse amplification system of claim 43, wherein said pulse source is a tunable laser diode.

45. The chirped pulse amplification system of claim 35, wherein said compressor is arranged in a double pass configuration.

46. The chirped pulse amplification system of claim 45, further comprising a beam coupling arrangement which directs the signal pulses to said compressor, receives the compressed signal pulses from said compressor, and directs the compressed signal pulses to said chirped quasi-phase-matched crystal.

47. A chirped pulse amplification system, comprising:
a pulse source generating chirped pulses;
a fiber amplifier receiving and amplifying the chirped pulses to thereby provide amplified pulses;

a compressor receiving and compressing the amplified pulses to thereby generate compressed signal pulses; and a quasi-phase-matched crystal receiving and further compressing the compressed signal pulses.

48. The chirped pulse amplification system of claim 47, wherein said compressor is arranged in a double pass configuration.

49. The chirped pulse amplification system of claim 48, further comprising a beam coupling arrangement which directs the signal pulses to said compressor, receives the compressed signal pulses from said compressor, and directs the compressed signal pulses to said chirped quasi-phase-matched crystal.

50. A chirped pulse amplification system, comprising:

a pulse source generating ultrashort pulses;

a stretcher stretching the ultrashort pulses to thereby provide stretched pulses;

a fiber amplifier receiving and amplifying the stretched pulses to thereby provide amplified pulses; and a quasi-phase-matched crystal receiving and compressing the amplified pulses.

51. The chirped pulse amplification system of claim 50, further comprising a compressor interposed between the fiber amplifier and the quasi-phase-matched crystal, and receiving and pre-compressing the amplified pulses before being applied to the quasi-phase-matched crystal.

52. The chirped pulse amplification system of claim 51, wherein said compressor comprises a nonlinear compressor.

53. The chirped pulse amplification system of claim 50, further comprising a non-linear amplifier interposed between the pulse source and the stretcher.

54. The chirped pulse amplification system of claim 50, wherein said fiber amplifier is a double-pass amplifier interposed between said pulse source and said stretcher, so that said ultrashort pulses pass through said fiber amplifier once before reaching the stretcher, and again after being stretched by the stretcher.

55. The chirped pulse amplification system of claim 54, further comprising a Faraday rotator interposed between the fiber amplifier and the stretcher.

\* \* \* \* \*